US008510577B2

(12) United States Patent
Scott et al.

(10) Patent No.: US 8,510,577 B2
(45) Date of Patent: Aug. 13, 2013

(54) REDUCING POWER CONSUMPTION BY OFFLOADING APPLICATIONS

(75) Inventors: James W Scott, Cambridge (GB); Yuvraj Agarwal, San Diego, CA (US); Stephen E Hodges, Cambridge (GB); Ranveer Chandra, Kirkland, WA (US); Paramvir Bahl, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 12/181,193

(22) Filed: Jul. 28, 2008

(65) Prior Publication Data

US 2010/0023788 A1 Jan. 28, 2010

(51) Int. Cl.
*G06F 1/00* (2006.01)
*G06F 1/26* (2006.01)
*G06F 1/32* (2006.01)

(52) U.S. Cl.
USPC ............................ 713/320; 713/300; 713/324

(58) Field of Classification Search
USPC ......................................... 713/300, 320, 324
See application file for complete search history.

(56) References Cited

U.S. PATENT DOCUMENTS

| | | | |
|---|---|---|---|
| 5,469,553 A | | 11/1995 | Patrick |
| 5,604,662 A | * | 2/1997 | Anderson et al. ........ 361/679.32 |
| 5,802,056 A | | 9/1998 | Ferguson et al. |
| 6,125,372 A | * | 9/2000 | White ................................... 1/1 |
| 6,501,999 B1 | * | 12/2002 | Cai ................................... 700/82 |
| 6,563,833 B1 | | 5/2003 | Wool et al. |
| 6,925,529 B2 | | 8/2005 | Bohrer et al. |
| 7,032,119 B2 | | 4/2006 | Fung |
| 7,035,972 B2 | | 4/2006 | Guha et al. |
| 7,043,650 B2 | | 5/2006 | Bresniker et al. |
| 7,092,943 B2 | | 8/2006 | Roese et al. |
| 7,093,149 B2 | | 8/2006 | Tsirkel et al. |
| 7,600,137 B2 | | 10/2009 | Trappeniers et al. |
| 7,673,161 B2 | | 3/2010 | Freeman et al. |
| 2002/0150098 A1 | | 10/2002 | Sharony |
| 2002/0167952 A1 | | 11/2002 | Watson et al. |
| 2002/0177449 A1 | | 11/2002 | McDonnell et al. |
| 2003/0212821 A1 | | 11/2003 | Gillies et al. |
| 2003/0217299 A1 | | 11/2003 | Neuman et al. |

(Continued)

OTHER PUBLICATIONS

Agarwal, et al., "Wireless Wakeups Revisited: Energy Management for VoIP over Wi-Fi Smartphones", ACM MobiSys 2007, 2007, pp. 179-191.

(Continued)

*Primary Examiner* — Mark Connolly
(74) *Attorney, Agent, or Firm* — Zete Law, P.L.L.C.; MacLane C. Key

(57) ABSTRACT

Methods of reducing power consumption in a computing device are described in which file sharing applications which are running in the background are offloaded onto a lower power subsystem and the rest of the computing device can be put into a low power state. The lower power subsystem runs application stubs which autonomously execute a subset of the operations performed by a file sharing application which was previously running on the computing device. Before the rest of the computing device goes into the low power state, application state information is passed to the lower power subsystem for use by the application stubs. In an example, the application stub may continue to download files whilst the rest of the computing device is in standby or is shutdown and the application state information may include details of the files that are to be downloaded.

19 Claims, 9 Drawing Sheets

U.S. PATENT DOCUMENTS

| | | | |
|---|---|---|---|
| 2004/0107273 | A1 | 6/2004 | Biran et al. |
| 2004/0230848 | A1 | 11/2004 | Mayo et al. |
| 2005/0044436 | A1 | 2/2005 | Holle |
| 2005/0204027 | A1 | 9/2005 | Claseman |
| 2005/0220054 | A1 | 10/2005 | Meier et al. |
| 2005/0278559 | A1* | 12/2005 | Sutardja et al. ............... 713/320 |
| 2006/0171329 | A1 | 8/2006 | Ying |
| 2006/0251115 | A1 | 11/2006 | Haque et al. |
| 2006/0280131 | A1 | 12/2006 | Rahman et al. |
| 2007/0006174 | A1 | 1/2007 | Sohm et al. |
| 2007/0011472 | A1 | 1/2007 | Cheng |
| 2007/0022121 | A1 | 1/2007 | Bahar et al. |
| 2007/0079008 | A1 | 4/2007 | Leibovich et al. |
| 2007/0079063 | A1 | 4/2007 | Mizuno |
| 2007/0136489 | A1 | 6/2007 | Temoshenko et al. |
| 2007/0150713 | A1 | 6/2007 | Almeida et al. |
| 2007/0162582 | A1 | 7/2007 | Belali et al. |
| 2007/0220202 | A1* | 9/2007 | Sutardja et al. ............... 711/113 |
| 2007/0286108 | A1 | 12/2007 | Meier et al. |
| 2008/0276016 | A1 | 11/2008 | Fujibayashi |
| 2008/0276042 | A1 | 11/2008 | Hetzler et al. |
| 2009/0063878 | A1 | 3/2009 | Schmidt et al. |
| 2009/0135751 | A1* | 5/2009 | Hodges et al. ................ 370/311 |
| 2009/0249001 | A1 | 10/2009 | Narayanan et al. |
| 2010/0036834 | A1 | 2/2010 | Bandas |
| 2010/0106903 | A1 | 4/2010 | Fujibayashi et al. |
| 2010/0169678 | A1 | 7/2010 | Kozuka |
| 2010/0257142 | A1 | 10/2010 | Murphy et al. |

OTHER PUBLICATIONS

Allman, et al., "Enabling an Energy-Efficient Future Internet Through Selectively Connected End Systems", ACM SIGCOMM HotNets, 2007, pp. 1-7.

Anand, et al., "SelfTuning Wireless Network Power Management", ACM MobiCom 2003 (1581137532/03/0009), 2003, pp. 176-189.

Benini, et al., "A Survey of Design Techniques for System-Level Dynamic Power Management", IEEE VLSI Transactions (1063 8210/00), vol. 8, No. 3, 2000, pp. 299-316.

Borisov, et al., "Generic Application-Level Protocol Analyzer and its Language", Microsoft Research, MSR-TR-2005-133, 2005, pp. 1-15.

Christensen, et al., "The next frontier for communications networks: Power management", Computer Communications, vol. 27, No. 18, 2004, pp. 1758-1770.

Douglis, et al., "Thwarting the Power-Hungry Disk", USENIX Winter Technical Conference, 1994, pp. 292-306.

Flautner, "Automatic Performance Setting for Dynamic Voltage Scaling", MobiCom 2001, 2001, pp. 260-271.

Flinn, et al., "Managing Battery Lifetime with Energy-Aware Adaptation", ACM Transactions on Computer Systems, No. 2, 2004, pp. 137-179.

"Full TCP Offload", retrieved on Oct. 23, 2008 at <<http://msdn.microsoft.com/en-us/library/aa503758(printer).aspx>>, Microsoft Corporation, <<http://www.microsoft.com/whdc/device/network/TCP_Chimney.mspx>>, 2008, pp. 1.

Gunaratne, et al., "Managing energy consumption costs in desktop PCs and LAN switches with proxying, split TCP connections, and scaling of link speed", John Wiley & Sons, Ltd.: International Journal of Network Management, vol. 15, No. 5, 2005, pp. 297-310.

Gupta, et al., "Greening of the internet", ACM SIGCOMM 2003 (1-58113-735-4/03/0008), 2003, pp. 19-26.

Huang, et al., "Design and Implementation of Power-Aware Virtual Memory", USENIX Annual Technical Conference, 2003, pp. 57-70.

Kravets, et al., "Application-Driven Power Management for Mobile Communication", Wireless Networks, vol. 6, No. 4, 2000, pp. 263-277.

Mogul, "TCP offload is a dumb idea whose time has come", IEEE HotOS, vol. 9, 2003, pp. 25-30.

Radunovic, et al., "Multipath Code Casting for Wireless Mesh Networks", retrieved on May 13, 2008 at <<http://saloot.googlepages.com/MultipathCodeCastingforWirelessMeshN.pdf>>, Microsoft Research, MSR-TR-2007-68, 2007, pp. 1-17.

Sabhanatarajan, et al., "Smart-NICs: Power Proxying for Reduced Power Consumption in Network Edge Devices", IEEE ISVLSI 2008, 2008, pp. 75-80.

Shih, et al., "Wake on Wireless: An Event Driven Energy Saving Strategy for Battery Operated Devices", ACM MOBICOM 2002 (158113486X/02/0009), 2002, pp. 160-171.

Simunic, et al., "Dynamic Power Management for Portable Systems", ACM MobiCom 2000, 2000, pp. 11-19.

Sorber, et al., "Turducken: Hierarchical Power Management for Mobile Devices", International Conference on Mobile Systems, Applications and Services, 2005, pp. 261-274.

Tang, et al., "Reliable On-Demand Multicast Routing with Congestion Control in Wireless Ad Hoc Networks", retrieved on May 13, 2008 at <<http://www.ee.ucla.edu/~simonhan/cs218/papers/spie01-ktang_BMW_ODMRP.pdf>>, Proceedings of SPIE, 2001, pp. 1-12.

"TCP Offload Engine", retrieved on Mar. 7, 2008 at <<http://en.wikipedia.org/wiki/TCP_Offload_Engine>>, Wikipedia, 2008, pp. 1-5.

U.S. Appl. No. 11/945,104.

"Wake on LAN Technology", retrieved on Oct. 23, 2008 at <<http://www.liebsoft.com/whitepapers/pdf_files/Wake_On_LAN.pdf>>, Lieberman Software Corporation (white paper), 2006, pp. 1-9.

Xie, et al., "AMRoute: Ad Hoc Multicast Routing Protocol", retrieved on May 13, 2008 at <<http://www.eecs.umich.edu/~mingyan/pub/amroute-monet.pdf>>, Kluwer Academic Publishers: Mobile Networks and Applications, vol. 7, 2002, pp. 429-439.

Yuan, et al., "A Cross-Layer Optimization Framework for Multihop Multicast in Wireless Mesh Networks", retrieved on May 13, 2008 at <<http://www.eecg.toronto.edu/~bli/papers/netcoding-mesh.pdf>>, WICON 2005 and IEEE Journal on Selected Areas in Communications, vol. 24, No. 11, 2006, pp. 2092-2103.

Zhu et al., "Power-Aware Storage Cache Management". IEEE, retrieved at <<http://opera.ucsd.edu/paper/TC05.pdf>>, 2005, pp. 35.

Zhu et al., "Power-Aware Storage Cache Management", retrieved Dec. 30, 2009 at <<http://ieeexplore.ieee.org/stamp/stamp.jsp?arnumber=01407848>>, IEEE Computer Society, Transactions on Computers, vol. 54, No. 5, May 2005, pp. 587-602.

Zhu et al., "TBBT Scalable and Accurate Trace Replay for File Server Evaluation", ACM, 2005, pp. 2.

Agarwal et al., "Somniloquy: Maintaining Network Connectivity While Your Computer Sleeps", Microsoft Research MSR-TR-2008-42, Mar. 2008 pp. 1=pp. 14.

"Active Notifications White Paper", Microsoft Corporation, Nov. 2006, pp. 16.

Agarwal, et al., "Dynamic Power Management using On Demand Paging for Networked Embedded Systems", IEEE, 2005, pp. 755-759.

Agarwal, et al., "On Demand Paging Using Bluetooth Radios on 801.11 Based Networks", CECS, Jul. 2003, pp. 19.

"Autonomous Mode Operation for Marvell USB 8388", retrieved on Sep. 27, 2007, at <<http://dev.laptop.org/ticket/1060.>>, pp. 5.

Bahl et al., "Wake on Wireless—a Case for Multi Radio Wireless LAN", Apr. 4, 2002, pp. 7.

"Intel Centrino Mobile Technology Wake on Wireless LAN (WoWLAN) Feature", Intel Corporation, 2006, pp. 6.

Kumar, et al., "Single-ISA Heterogeneous Multi-Core Architectures: The Potential for Processor Power Reduction", Proceedings of the 36th International Symposium on Microarchitecture, Dec. 2003, pp. 12.

Mayo et al., "Energy Consumption in Mobile Devices: Why Future Systems Need Requirements-Aware Energy Scale-Down", Hewlett-Packard Company, 2003, pp. 10.

Mishra, et al., "Wake-on-WLAN", ACM, 2006, pp. 9.

Olsen, et al., "Multi-Processor Computer System Having Low Power Consumption", Springer-Verlag Berlin Heidelberg, 2003, pp. 53-67.

Pering, et al., "CoolSpots: Reducing the Power Consumption of Wireless MObile Devices with Multiple Radio Interfaces", ACM, 2006, pp. 220-232.

Pering, et al., "Exploiting Radio Hierarchies for Power-Efficient Wireless Device Discovery and Connection Setup", IEEE, 2005, pp. 6.

"Physically Connecting to a Network or Broadband Modem", at <<http://support.dell.com/support/edocs/system/latd820/en/ug/network.htl>>, Dell, 2007, pp. 12.

U.S. Appl. No. 11/945,104, filed on Nov. 26, 2007, Stephen Hodges, Yuvraj Agarwal, Paramvir Bahl, Ranveer Chandra, Scott James, "Low-Power Operation of Networked Devices," 45 pages.

U.S. Appl. No. 12/059,695, filed on Mar. 31, 2008, Dushyanth Narayanan, Austin Donnelly, Sameh Elnikety, Antony Rowstron, Eno Thereska, "Storage Systems Using Write Off-Loading", 58 pages.

U.S. Appl. No. 12/714,223, filed on Feb. 26, 2010, Eno Thereska, Austin Donnelly, Dushyanth Narayanan, "Reducing Power Consumption of Distributed Storage Systems," 58 pages.

"Industry Report—Digital Lifestyles: 2010 Outlook," retrieved on Apr. 4, 2011 at <<http://www.parksassociates.com/report/digital-lifestyles-2010-outlook>>, Parks Associates, 2010, pp. 1-2.

"Industry Report—Home Networks for Consumer Electronics," retrieved on Apr. 4, 2011 at <<http://www.parksassociates.com/report/home-networks-for-consumer-electronics>>, Parks Associates, 2009, pp. 1-4.

Jiang et al., "Enabling Autonomic Power-Aware Management of Instrumented Data Centers," retrieved on Dec. 30, 2009 at <<http://ieeexplore.ieee.org/stamp/stamp.jsp?arnumber=05160976>>, IEEE Computer Society, Proceedings of Symposium on Parallel and Distributed Processing (IPDPS), 2009, pp. 1-8.

Joukov et al., "Accurate and Efficient Replaying of File System Traces," In Proc. USENIX Conference on File and Storage Technologies (FAST 2005), 2005, pp. 14.

Kim et al., "Power Management in Disk Storage System with Multiple RPM levels," ACEED, Mar. 1, 2005, pp. 1.

Kistler et al., "Disconnected Operation in the Coda File System," retrieved on Nov. 22, 2010 at http://www.cs.smu.edu/~coda/docdir/s13.pdf, ACM Transactions on Computer Systems, vol. 10, No. 1, Feb. 1992, pp. 3-25.

Kotsovinos et al., "replic8: Location-aware data replication for high availability in ubiquitous environments," retrieved on Aug. 26, 2010 at <<http://www.kotsovinos.com/research/papers/relic8.pdf>>, Springer-Verlag Berlin, LNCS vol. 3510, Proceedings of Intl Conference on Wired/Wireless Internet Communications (WWIC), Xanthi, Greece, May 2005, pp. 32-41.

Krishnan et al., "Thwarting the power-hungry disk," USENIX Winter, 1994, pp. 15.

Li et al., "EERAID Energy Efficient Redundant and Inexpensive Disk Arrays," ACM, 2004, pp. 1-14.

"Managing Enterprise Storage," retrieved on Jan. 11, 200 at <<http://www.informationweek.com/news/showArticle.jhtml?articleID=202404374>>, pp. 1-4.

Mazurek et al., "Access Control for Home Data Sharing: Attitudes, Needs and Practices," retrieved on Nov. 22, 2010 at <<http://lorrie.cranor.org/pubs/chi2010-access-control.pdf, ACM, Proceedings of Intl Conference on Human Factors in Computing Systems (CHI), Atlanta, Georgia, Apr. 2010, pp. 645-654.

Microsoft. Event tracing, <<http://msdn.microsoft.com/en-gb/library/bb968803(VS.85).aspx>> retrieved from the internet on Aug. 12, 2008, 1 page.

"NAND Flash-Based Solid State Disk," Samsung Electronics, 2007, pp. 1-62.

Narayanan et al., "Everest: Scaling down peak loads through I/O off-loading," retrieved on Dec. 30, 2009 at <<http://research.microsoft.com/pubs/68163/Everest-OSDI08.pdf>>, USENIX Association, Proceedings of OSDI, 122008, pp. 1-14.

Narayanan et al., "Write Off-Loading Practical Power Management for Enterprise Storage," ACM Transactions on Storage (TOS), vol. 4 Issue 3, Nov. 2008, New York, NY, pp. 15.

News release, Jun. 25, 2007, <<http://www.hp.com.hpinfo/newsroom/press/2007/070625xa.html>>, pp. 1-3.

Nightingale et al., "Energy-efficiency and storage flexibility in the blue file system," Proceedings of the 6th conference on Symposium on Operating Systems Design & Implementation—vol. 6, Berkeley, CA, 2004, pp. 16.

Ellard et al., "Passive NFS Tracing of Email and Research Workloads," In Proc. USENIX Conference on File and Storage Technologies (FAST 2003), 2003, pp. 23.

* cited by examiner

REDUCING POWER CONSUMPTION BY OFFLOADING APPLICATIONS

BACKGROUND

It is becoming increasingly desirable to reduce the power consumption of devices, including computing devices. Where the devices are battery powered, reducing power consumption is beneficial because it increases battery life; however, even where devices are mains powered, a reduction in power consumption has environmental benefits and reduces running costs.

There are a number of approaches which have been developed to reduce the power consumption of computing devices. One approach is to power down the display after a defined period of inactivity and another approach is to put the computing device itself into a low power mode (e.g. by shutting down or suspending the device) when it is not being used. A further approach is to use a reduced power mode when a battery operated device is not connected to mains electricity, e.g. by reducing the brightness of the display.

The embodiments described below are not limited to implementations which solve any or all of the disadvantages of known techniques for reducing the power consumption of computing devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of reducing power consumption in a computing device are described in which file sharing applications which are running in the background are offloaded onto a lower power subsystem and the rest of the computing device can be put into a low power state. The lower power subsystem runs application stubs which autonomously execute a subset of the operations performed by a file sharing application which was previously running on the computing device. Before the rest of the computing device goes into the low power state, application state information is passed to the lower power subsystem for use by the application stubs. In an example, the application stub may continue to download files whilst the rest of the computing device is in standby or is shutdown and the application state information may include details of the files that are to be downloaded.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
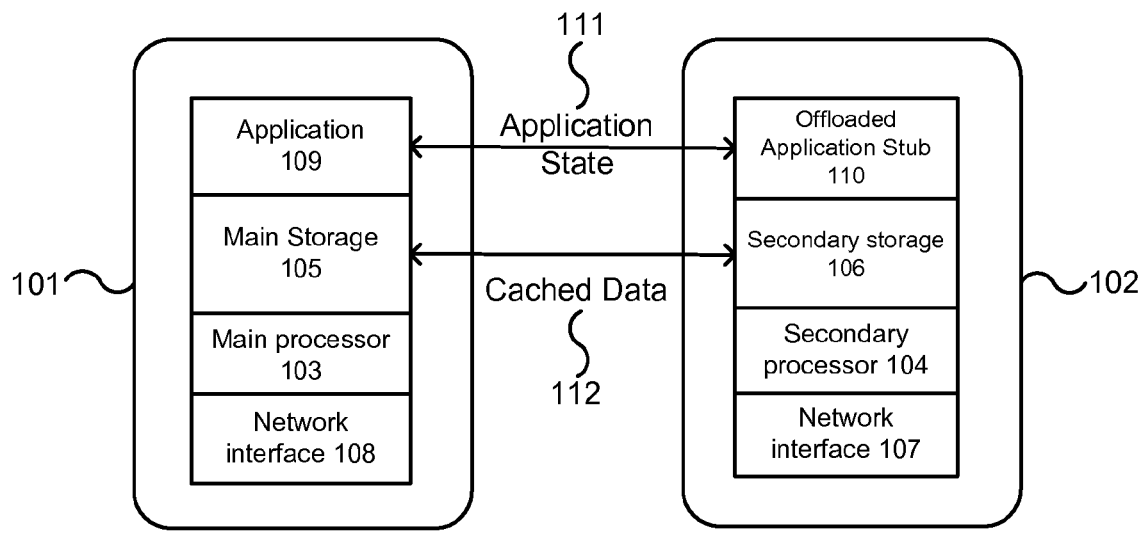
FIG. 1 is a schematic diagram of an example architecture which enables applications which are operating in background mode to be offloaded onto a lower power subsystem.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Many of the existing techniques for reducing power consumption involve switching off or suspending the activities of the computing device following a period of activity or upon user command (e.g. when a user closes a laptop computer or pushes a 'suspend' button); however there are many situations where a user does not want to stop the tasks being performed by a computing device. U.S. patent application Ser. No. 11/945,104 (filed Nov. 26, 2007), which is incorporated herein by reference in its entirety, describes a low power mode of operation in which a processing element performs networking functions on behalf of the main processor. This maintains the network connectivity of the computing device in a manner which is transparent to other elements in the network.

There are also many situations where a user does not want to stop tasks being performed by a computing device because, for example, the tasks take a long time to complete or the tasks, once started, do not require user interaction. An example of such a task is file sharing, which includes content distribution and peer to peer file sharing applications and downloading of software patches (e.g. where a software patch is made available by a server or may, in some instances, be pushed to devices which require the patch). It will be appreciated that file sharing may comprise downloading and/or uploading of files. In file sharing, the files being shared have no predefined ultimate destination (i.e. a file is not created and shared for distribution to a particular person) and the files are downloaded/uploaded based on properties of the recipient device, which include the configuration of the recipient device (e.g. software that is loaded, hardware which is available) and preferences set on the recipient device (e.g. details of files that are required or user preferences). This is unlike email, where the destination is defined when an email is sent and the communication is person to person. Additionally, emails are timely, i.e. they are sent at a particular time, whereas files may be made available for file sharing and may be downloaded/uploaded at a subsequent time according to the recipient device. In many examples of file sharing, where downloading is performed, it is at the request of the application running on the computing device (e.g. a pull operation at the application layer). The process of downloading a file may take many minutes or even hours and therefore a user may initiate the file download and then leave their computer switched on in order to complete the download whilst the user is not interacting with the computer (e.g. overnight when the network may be less congested). Another example of such a task is recording television or radio programs using the computing device (e.g. using a PVR (personal video recorder) application). In such an example, the recording may take place whilst the user is out or otherwise away from the computing device and therefore there is no need for the display or user interface of the computing device to be active.

FIG. 1 is a schematic diagram of an architecture which enables applications which are operating in background mode (i.e. where the user is not interactively involved) to be offloaded onto a lower power subsystem. The main processor (and ancillary hardware) can then be put into a low power state, e.g. shut down or suspended. Depending upon the particular application, it may not be necessary to ensure that network connectivity is maintained in a transparent manner and therefore the methods described herein may be considered orthogonal to those described in U.S. Ser. No. 11/945, 104 (as detailed above). The applications which are operating in background mode may, for example, include file sharing applications (e.g. content distribution, peer to peer applications and downloading of software patches), PVR applications or any application where there is a direct peripheral to peripheral transfer of data which does not require any user interaction, where the data being distributed has no pre-defined destination and where the data is downloaded based on properties of the recipient device.

The architecture comprises two separate power domains: a higher power domain 101 and a lower power domain 102, where the lower power domain 102 has a lower power consumption when operating than the higher power domain 101. Each domain comprises a processor 103, 104 and a persistent storage element 105, 106. The lower power domain 102 also comprises a network interface 107 and the higher power domain 101 may also comprise a network interface 108 (although in some examples there may not be a network interface in the higher power domain). The higher power domain runs full applications 109 (e.g. full file sharing applications) whilst the lower power domain runs application stubs 110 (e.g. file sharing application stubs). An application stub 110 performs a subset of the functionality of the full application 109 and examples are described in more detail below.

The operation of the architecture shown in FIG. 1 can be described with reference to FIG. 2. The secondary processor 104 detects that the higher power domain 101 is preparing to enter or is entering a low power mode or is about to shut down (block 201). Depending upon the operating system (OS) being used, there may be a number of different low power modes that may be available, e.g. Microsoft® Windows® XP provides a standby mode (S3) in which the power to hardware devices which are not being used is switched off but the power to the memory is maintained, and a hibernate mode (S4) which writes the volatile RAM of the computer to non-volatile disk, including the current state of the operating system and applications before powering down the computer. Microsoft® Windows Vista® provides a hybrid sleep mode in which the volatile RAM is written to non-volatile disk (like hibernate) before entering standby mode. Other operating systems may provide other low power modes, such as S1 or S2 sleep states (where in S1 the hardware and processor context is maintained, whilst in S2, the processor loses power and the processor context and contents of the cache are lost) or may use different names to refer to the low power modes (e.g. S3 may also be called a suspend mode). The methods described herein are applicable to any operating system and where a particular operating system is named in the examples described herein, this is by way of example only. For the purposes of the following description, any terminology relating to the higher power domain preparing to go to sleep or actually going to sleep is intended to encompass the process of the higher power domain entering any low power state, where the lower power state may be a low power mode (e.g. S1-S4) or where the higher power domain is switched off (S5). The detection of the higher power domain entering a low power state or preparing to go to sleep (in block 201) may be performed in any suitable manner, for example by monitoring the power drawn by the main processor 103. In another example, the main processor 103 may send a message to the secondary processor 104 indicating that the higher power domain 101 is about to shut down or enter a low power mode. The detection of the higher power domain entering a low power state may comprise detection of the preparation for entry of the low power state, detection of the transition (i.e. the actual entry of the low power state) or detection that the higher power domain is in the low power state.

Having detected that the higher power domain 101 is preparing to go to sleep (in block 201), application state information 111 is transferred between the two domains (block 202) and this may be a one way process (e.g. from the higher power domain 101 to the lower power domain 102) or a two way process (e.g. synchronization). The application state information 111 may be transferred between the full application 109 running in the higher power domain 101 and the application stub 110 running in the lower power domain 102. This application state information may include details of which applications (e.g. which file sharing applications) are currently running on the computing device and any state information or settings associated with one or more applications that are running, e.g. the files currently being downloaded by a file sharing client. The content of the application state information 111 may be dependent on the applications and/or types of applications which are running in the higher power domain. In an example, the application state information for an OS patching application (which is an example of a file sharing application) may comprise a current list of patches applied to the computer and other configuration data of that computer (e.g. hardware configuration). This information (which may be referred to as properties of the computer) may enable the corresponding application stub to determine when a new patch needs downloading. Where the application is a file sharing application such as a peer to peer file sharing application, the application state information 111 may include an index file which describes the files that a file sharing application is downloading and the parts of the file that have already been downloaded or are still required. The application state may also include cached data 112 such as files which the application is uploading to another device or which the application has made available to other devices. In other examples, the cached data 112 may include parts of a file that have already been downloaded. The cached data 112 may be transferred between the main storage 105 and the secondary storage 106 (which may also be referred to as a cache).

Having transferred the required information (in block 202), the application stub is executed, or launched, (block 203) and can continue a subset of the operations of the application (e.g. any or all of the applications 109 previously running on the higher power domain 101) autonomously, i.e. without user input. This subset of operations may comprise any or all of the operations of the application. In an example, where the application 109 is a file sharing application, the application stub 110 may continue to download a requested file based on the synchronized state information 111. The application stub may also initiate download of new files and/or make files available for upload.

The secondary processor 104 may wake the higher power domain 101 when defined criteria are met (block 204), e.g. on completion of a file download, when the secondary storage becomes (or gets close to becoming) full or upon a different trigger event. Another example of a trigger event is where a remote host requests a file that is not stored in the secondary storage 106 but is stored in the main storage 105. In such an example, the higher power domain 101 may be woken in order to download the file from the main storage 105 to the secondary storage 106 and then the higher power domain 101 may go back to sleep, alternatively the higher power domain may remain awake whilst the file is transferred from the main storage 105 to the remote host. The higher power domain 101 may, alternatively, wake-up as a result of a different trigger (e.g. a user input) and this may be detected by the secondary processor (block 205) or other element in the lower power domain. The term 'wake-up' is used herein as the opposite process to going to sleep, i.e. going from a low power mode or off state to a higher power (e.g. a normal power, S0) mode.

The lower power domain may use any suitable technique to trigger the wake-up of the higher power domain (in block 204). Examples include using interrupt lines (e.g. which may be raised to initiate wake-up), using the ring indicator on a COM port or virtual COM port (e.g. using USB), by spoofing a keyboard or other device with wake-up capabilities, by mimicking the pressing of a physical power button such as the user might normally press to cause the main processor to wake from a lower power mode (e.g. from standby/suspend) or using any mechanism which supports events-based wake up.

The wake-up detection (in block 205) may use any suitable technique and may include monitoring the power drawn by the main processor or receiving a notification from the main processor (in a corresponding manner to the detection of the higher power domain going to sleep in block 201).

Upon wake-up of the higher power domain (either triggered by the secondary processor in block 204 or detected by the secondary processor in block 205), the application state information 111 may be transferred between the full application 109 and the application stub 110. This transfer may be a transfer of some/all of the application state information 111, or in some cases no state may be transferred. The transfer may be a one way flow of data (e.g. from the lower power domain to the higher power domain) or may be a two-way synchronization process. The transfer of application state (in block 206) may, for example, include updating the application with details of the files (or parts thereof) that have been downloaded whilst the main processor was asleep and/or transferring data downloaded in this period from the secondary storage 106 to the main storage 105. Whilst the data may alternatively be maintained in the secondary storage and accessed from the secondary storage by the full application or other elements/applications within the higher power domain 101, in many examples the capacity of the secondary storage may be significantly smaller than the main storage (e.g. a few GB compared to hundreds of GB) and therefore it may be beneficial to transfer the data to the main storage. However, this transfer need not take place instantly and in some implementations may be performed more slowly, for example when there is reduced load on the main storage (e.g. in terms of I/Os). Once the main processor has woken up and any necessary application state has been transferred (in block 206), the application stub may be stopped (block 207).

Figure 2:
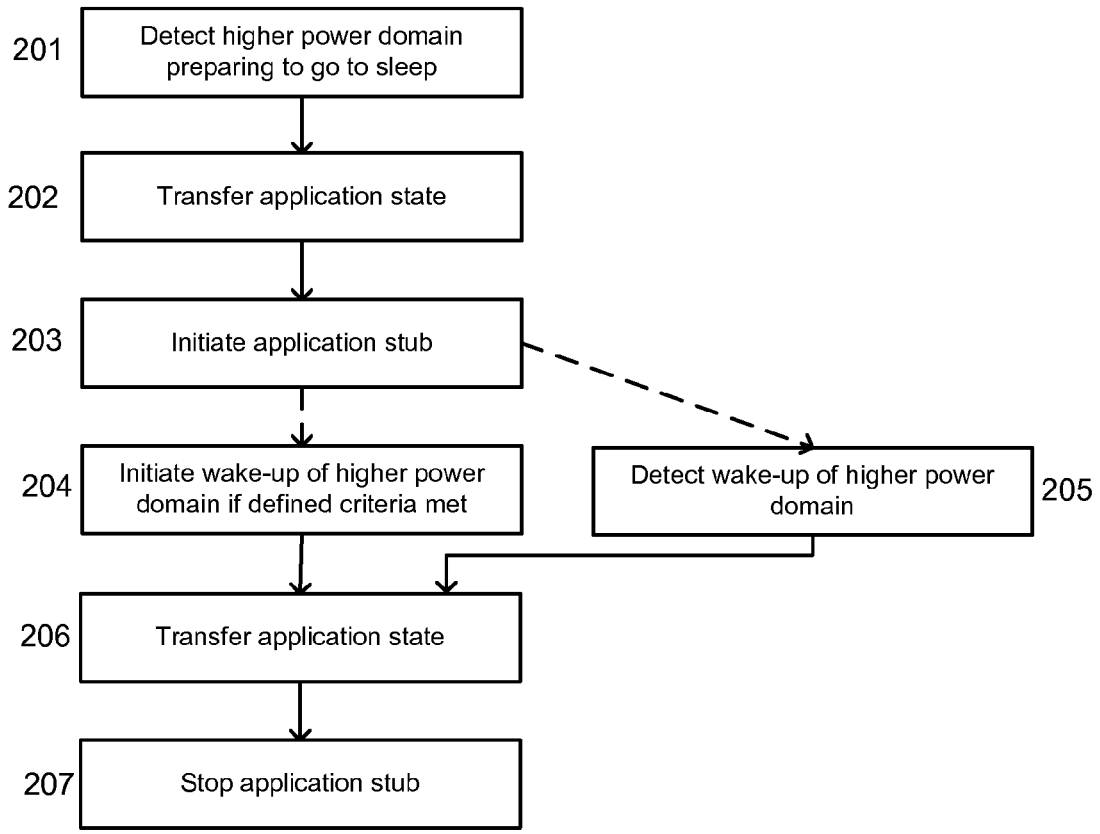
FIGS. 2 and 3 are flow diagram of example methods of operation of the architecture shown in FIG. 1.

Although FIG. 2 shows the application stub stopping (in block 207), in some embodiments, the application may be run from the lower power domain even when the higher power domain is not asleep (i.e. when the higher power domain is 'on'), e.g. where the scheduled activities of the application (e.g. downloading a file) are nearly complete. This avoids the overhead of switching (e.g. the transfer process in block 206). In another example, where the transfer of the application state (e.g. the transfer of cached data 112) is performed by the application stub and where it is performed over a period of time, the application stub may remain running until the transfer is complete. In an embodiment where both the domains comprise a network interface (as shown in FIG. 1), the full application 109 and the application stub 110 may operate in parallel to provide increased performance (e.g. where the combined performance of both network interfaces is greater than the performance of either network interface on its own). In a further example, the application may be run from the lower power domain to free up the higher power domain for other tasks.

FIG. 2 shows that the transfer of application state (in block 202) occurs after it has been detected that the higher power domain is preparing to go to sleep (in block 201). In another embodiment, however, the transfer may occur before the detection step (i.e. block 202 before block 201). In such an embodiment, the transfer may be performed periodically between the higher and lower power domains or may be performed substantially continuously.

As described above, depending upon the particular application, it may or may not be necessary to maintain network connectivity in a manner which is transparent to other elements in the network when the higher power domain goes to sleep (e.g. using the methods described in U.S. patent application Ser. No. 11/945,104). For example, some file sharing applications may not require network connectivity to be maintained transparently as long as the application stub has data on the file required and the parts of the file that have already been received (to avoid duplication in download, although this is not essential) and this information is provided in the transfer process (block 202). In such an example, the lower power domain may have a different IP address, MAC address etc. in the network to the higher power domain; however, the higher power domain and the lower power domain operate as a single system and the offloading is performed in a manner which is not visible to other entities in the network because the identity of the application/client may be defined, not in terms of IP or MAC addresses (which may be referred to as a network identity), but by what files are being shared (e.g. the files being downloaded, the portions of the files that have already been downloaded and the files that are being made available for upload) and this information is transferred between domains as part of the application state information 111. Whilst network connectivity may not be required to be maintained in a transparent manner (i.e. IP and/or MAC address is maintained when the higher power domain enters the low power state and the application stub is launched on the lower power domain), in some embodiments network connectivity may be maintained transparently, as described below.

Figure 3:
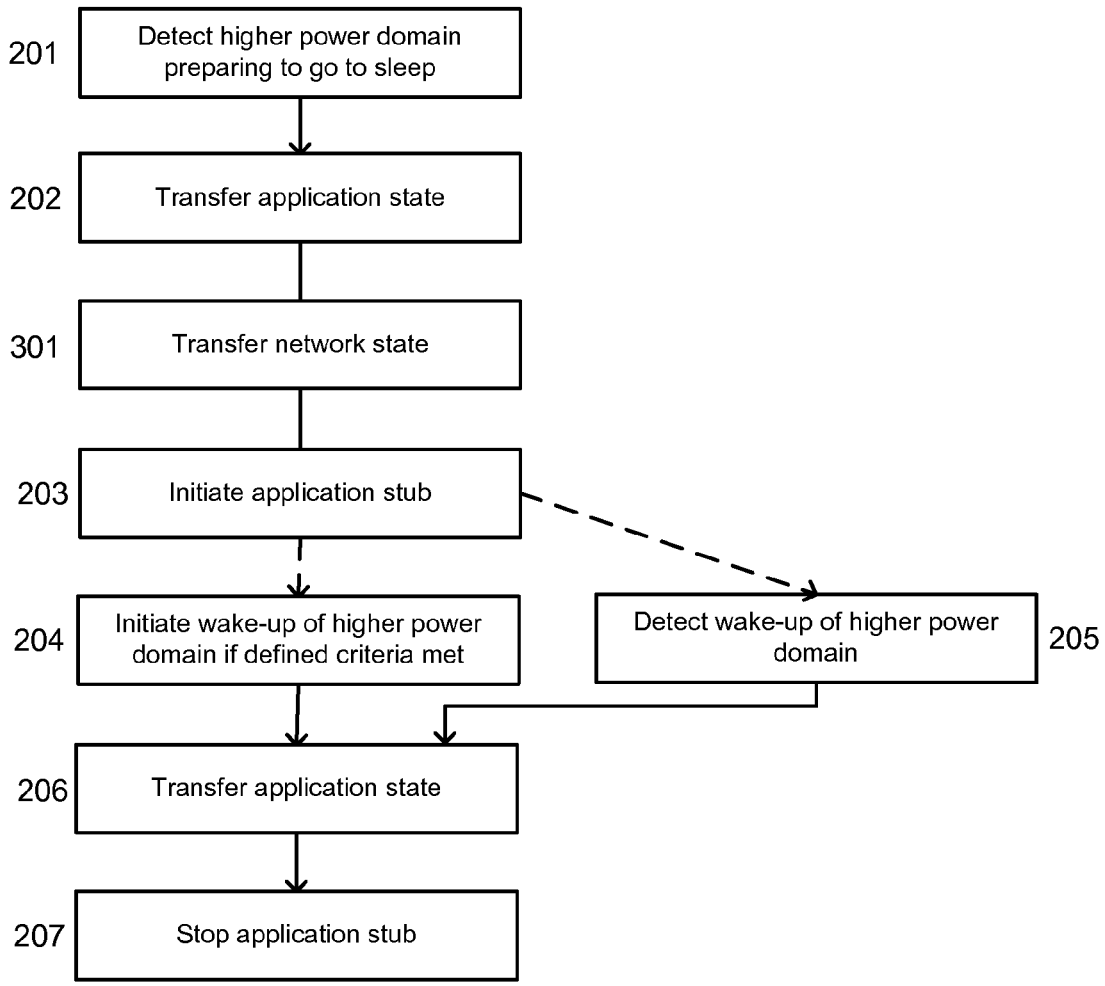

In order to maintain network connectivity in a transparent manner, network state information may also be transferred between the higher power domain and the lower power domain (block 301), in addition to the application state information 111, as shown in FIG. 3. This state information may include the current IP address, username and password (or other authentication details such as wireless security keys), details of wired/wireless access points that the main processor is allowed to use and any associated authentication or configuration information, etc. This network state information may be transferred following detection that the higher power domain is preparing to go to sleep (in block 202, as shown in FIG. 3) or may alternatively be performed periodically or substantially continuously whilst the main processor is awake. The network state information that is transferred may depend upon whether the higher power domain 101 comprises a network interface 108 (as shown in FIG. 1) or whether there is a single functioning network interface 107 located in the low power domain 102.

Even in some examples where network connectivity is not maintained transparently (i.e. where the full application and the application stub have separate network identities), some network state information may be transferred (e.g. in block 301, using the method of FIG. 3). For example, network authentication details may be shared in order to allow the lower power domain to access networks.

Figure 4:
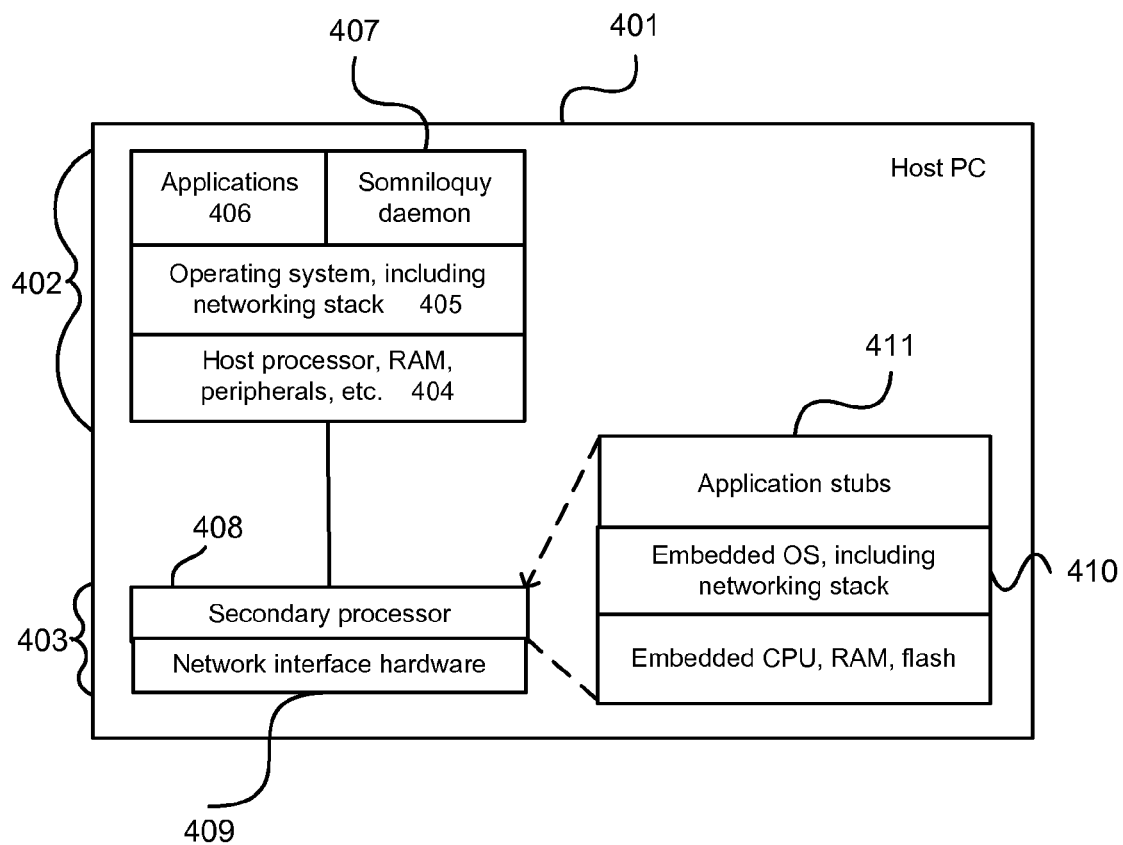
FIG. 4 is a schematic diagram of a second example architecture.

FIG. 4 is a schematic diagram of another architecture which enables applications which are operating in background mode (i.e. where the user is not interactively involved) to be offloaded onto a lower power subsystem. The host PC 401 comprises a higher power domain 402 and a lower power domain 403. The higher power domain 402 may comprise standard hardware 404, such as a host processor, memory (e.g. RAM) and peripherals, and standard software 405-406, such as an operating system, including a networking stack, 405 and application software 406. The application software 406 may, for example, comprise a file sharing application. The higher power domain also comprises additional software 407 which is used in the transfer of data between the two domains (e.g. in blocks 202, 206 and 301 of FIGS. 2 and 3). For example, the additional software 407 provides details to the lower power domain about which application stubs need to be run in the lower power domain 403 and which events will trigger wake-up. In some examples, such as those where network connectivity is maintained transparently (i.e. the full application and the application stub share a network identity), the additional software 407 may also ensure that the secondary processor 408 has a copy of the state pertaining to the current network connection, such as the DHCP (Dynamic Host Configuration Protocol) lease details and the current IP (Internet Protocol) address. The additional software 407 may be referred to herein as a 'Somniloquy daemon'.

Although FIG. 4 shows an additional software element 407, in some examples, the activities which are described above as being performed by the additional software element may alternatively be performed by the applications themselves. In such an example, the applications may control when offloading occurs (e.g. an offloading aware application). In other examples, operating system support or support from a sleep aware program may be used to augment existing programs with sleep-aware functionality in order to perform offloading as described herein (e.g. to augment an existing file sharing application).

Figure 5:
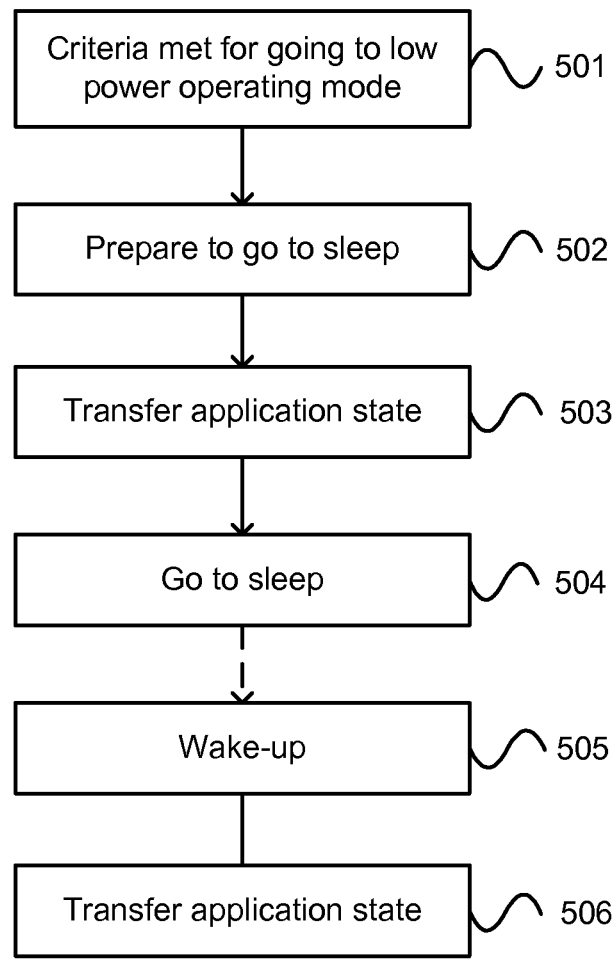
FIG. 5 is a flow diagram of an example method of operation of a higher power domain.

FIG. 5 is a flow diagram of an example method of operation of the higher power domain and some or all of these method steps may, for example, be performed by the additional software 407. If it is determined (in block 501) that the only applications running could be run in the lower power domain or that other criteria for going to sleep are met (e.g. manual initiation, a defined period of inactivity or based on time of day), the process of putting the higher power domain to sleep is initiated (block 502). Transfer of application state (block 503) occurs before the higher power domain goes to sleep (block 504). When the higher power domain goes to sleep, any applications currently running on the domain will be suspended. Subsequently, the higher power domain wakes-up (block 505) and this may be triggered by the lower power domain (as shown in FIGS. 2 and 3), by the higher power domain (e.g. based on time of day) or by manual intervention by the user. On wake-up, the application state may be transferred between the lower power and higher power domains (block 506).

The low power domain 403 in the host PC 401 comprises a secondary processor 408 and network interface hardware 409. Despite consuming less power than the host processor, the secondary processor 408 is still capable of running an embedded operating system including a networking stack 410. When the host processor is powered on, the secondary processor may do little; the PC runs its regular networking stack which communicates directly with the network interface hardware 409. However, when the host processor is asleep, power to the network interface 409 and the associated secondary processor is maintained, allowing it to operate autonomously. The lower power domain 403 also comprises persistent memory (e.g. RAM and flash), which may be part of the secondary processor 408 in addition to an embedded CPU and application stubs 411.

Figure 6:
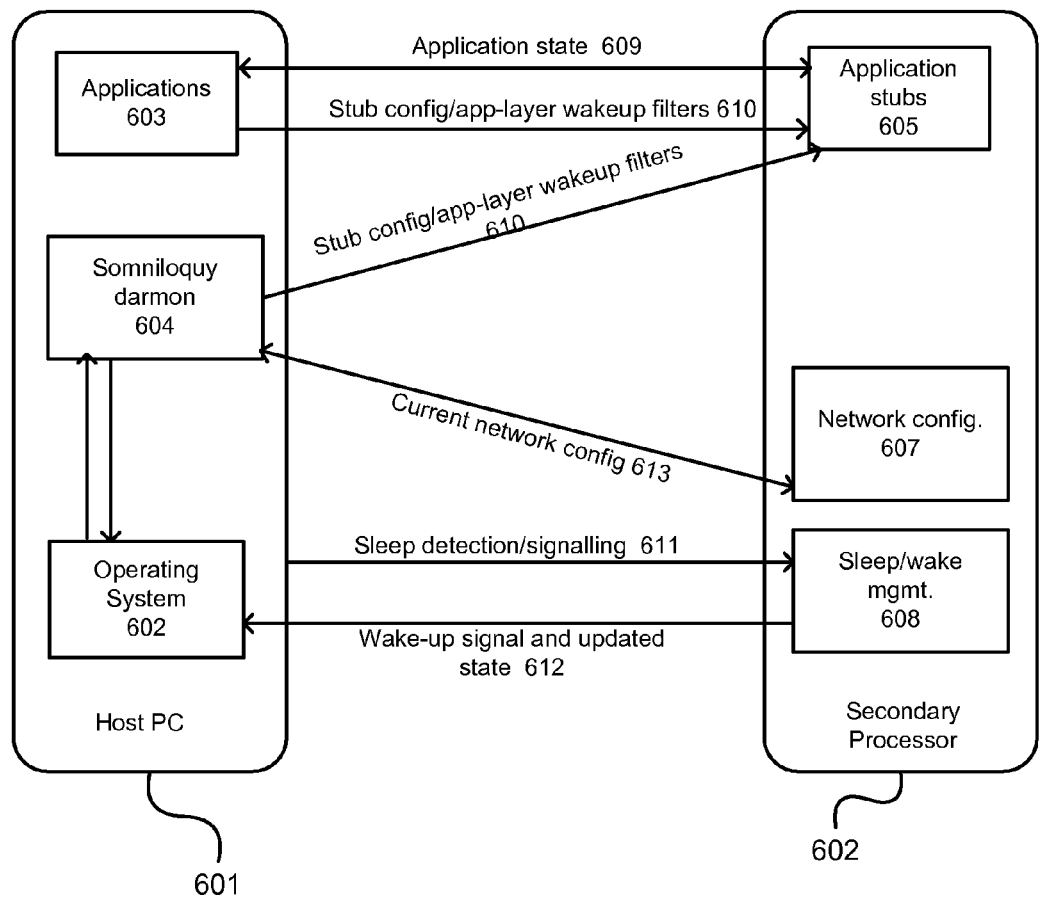
FIG. 6 is a schematic diagram showing the software components which run in each of the higher and lower power domains.

FIG. 6 is a schematic diagram showing the software components which run on the host PC 601 (i.e. in the higher power domain) and on the secondary processor 602. Where the lower power domain is provided using external hardware, the higher power domain and the host PC may be the same. Alternatively, the higher power domain may be a subset of the host PC. FIG. 6 also shows some examples of the data flow between the higher power domain and the lower power domain. The software components running on the host PC 601 (or the higher power domain) include an operating system 603, one or more applications 603 and, where required, the software component which is used in transfer of application state (the Somniloquy daemon) 604. The software components running on the secondary processor include application stubs 605, network configuration software 607 and sleep/wake management software 608. The data transferred between the host PC and the secondary processor (i.e. between the higher power and the lower power domain) may comprise the application state 609, stub configuration details and application layer wake-up filters 610, sleep detection/signaling 611 (for use in detection of sleep/wake events, e.g. in blocks 201 and 205), and a wake-up signal and/or updated state information 612. The data transferred may also include, (e.g. where network connectivity is to be maintained transparently or where network authentication details are required by the lower power domain), details of the current network configuration 613. It will be appreciated that the sleep detection/signaling may be performed in a number of different ways and may involve software and/or hardware based detection.

Whilst FIG. 6 shows both single ended arrows and double ended arrows, this is by way of example only. Data flow between any of the components may be bidirectional or unidirectional and there may be additional flows of data between components which are not shown in FIG. 6.

Although FIGS. 1 and 4 show distinct hardware associated with each of the lower power and higher power domains 101,102, 402, 403 in some embodiments the same physical hardware may be used. In some embodiments, the physical hardware may be partitioned between the two domains, such that a portion of the physical hardware is not part of both domains. In a first example, the lower power domain may be implemented as an enhancement of the main network interface card (NIC) of the higher power domain. In such an example, when the main processor is asleep, inbuilt lower-power processor functionality within the NIC is used whilst using the same network interface (i.e. the same transmitter/receiver). In a second example, the storage may be shared. In such an example, a hard disk (e.g. a normal spindle disk or flash-based disk) may be augmented with another interface (e.g. a Secure Digital (SD) interface), so that the lower power domain can use the second interface, which may be less complex (and perhaps slower), whilst the main processor uses the faster and more complex ATA (Advanced Technology Attachment) interface. In such an example, communication between power domains may be performed using shared read/write areas on the disk itself. In a third example, the main processor may comprise a multi-core processor and on going to sleep, the main processor may power down most of the cores leaving only a lower-power core running as the secondary processor. In such an example, the lower-power core may use the normal channels to RAM, disk, network card etc. or special low power channels may be used. In this example, the lower power domain is a subset of the higher power domain.

The application stub 110, 411, 605 associated with a full (or main) application 109, 406, 603 (e.g. a full file sharing application) comprises code that performs a subset of the functionality of the full application (where this subset may include all the functionality of the full application). The application stubs may be written separately for each application and may implement (or support) one or more of the following:

transfer of state back to the higher power domain when it wakes up;

login for the particular application, including the credentials and the encryption mechanism used by the application;

handling of messages that do not require the host processor to be woken up, such as keep-alive messages, or messages that update the state of the application, such as a presence update for an IM (Instant Messenger) application; and wake-up on application events, such as a VoIP (Voice over Internet Protocol) call from a specific contact.

In a first example, an application stub may not comprise any of the user interface (UI) functionality of the main application, or other features that are necessary for the UI but not for the network-facing parts of the application. In a second example, the application stub may also not include parts of the protocol that are not required during sleep mode (e.g. more complex functionality that may not be required for operation of the application when it can operate in a simpler mode). In another example, a tool such as the Generic Application-Level Protocol Analyzer may be used to parse a protocol automatically and delineate the protocol calls that need to be handled in the network interface and those which require waking the host. The application stubs may be stored in the lower power domain, or alternatively they may be stored in the higher power domain and the relevant stubs transferred to the lower power domain as part of the transfer process (e.g. in block 202 or 503 in FIGS. 2, 3 and 5).

The application stubs may be created in concert with the full application, or can be created as an extension to an existing application or as a patch to existing applications. In an example, the application stub may comprise a command-line version of the full application which is executed or interpreted by the secondary processor, and may or may not be executable or interpretable by the main processor. The state transfer functionality may be included in the stub executable or provided as a separate component to the stub executable (e.g. the ctorrent stub, described below, does not have .torrent transfer functionality, and this may be added on with another script or executable).

In an example, a stub for a BitTorrent file sharing application may be written by customizing a console based client, ctorrent, to have a low processor and memory footprint. Due to the robustness of the BitTorrent protocol, this stub automatically resumes incomplete torrent downloads that were initiated on the host computer. Prior to going to sleep, the higher power domain transfers the '.torrent' file and the portion of the file that has already been downloaded to the lower power domain. The stub then resumes the download of the torrent file and stores the downloaded data temporarily on the secondary storage which is part of the lower power domain (or subsystem). As described above, a download complete event may be used as a trigger to wake-up the higher power domain. The downloaded file may then be retrieved by the host when it resumes using a file transfer protocol.

It will be appreciated that BitTorrent is one example of a file sharing protocol which is described herein by way of example only. Other file sharing protocols may alternatively be used.

Peer to peer file sharing works by storing partial or completed files on disk (as files can be too large to fit into RAM) and communicating with one or more other servers in the network to perform functionality such as identifying and downloading new files which are of interest to a user, completing partial downloads, uploading content to peers who request it, maintaining and sharing state information concerning the network of peers, etc.

Figure 7:
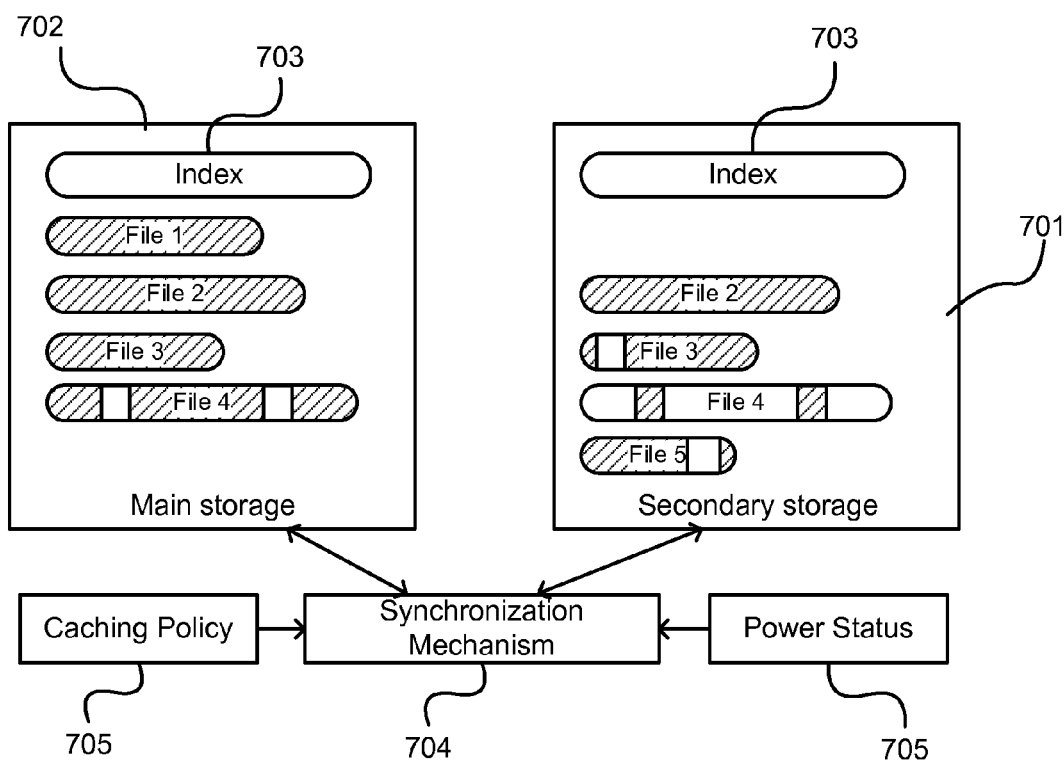
FIG. 7 shows a schematic diagram of the main and secondary storage a the synchronization mechanism.

To offload a file sharing application, it may not be sufficient to offload the application's control state without storage space to both read and write shared content. The secondary storage 106 in the lower power domain may be used as a cache for the main (larger) storage. FIG. 7 shows a schematic diagram of the main and secondary storage and the synchronization mechanism. As shown in FIG. 7, the cache (on the secondary storage 701) may be similar in structure to the main storage 702. While FIG. 7 shows similar amounts of storage in the main store and secondary store, in practice the main store may be many times larger than the secondary storage. The index file 703, which describes metadata and status for the content files, may be duplicated between the two storage elements or a partial copy may be made and stored in the secondary storage 701 for space-saving reasons.

There is a synchronization mechanism 704 by which files including the index can be partially or wholly transferred between the main storage and the secondary storage, with synchronization being triggered in many cases by a change in power state 705, e.g. the computer preparing to go to sleep, or resuming from sleep (as described above and shown in FIGS. 2 and 3).

The choice of which files from the index 703 are copied into the secondary storage 701 may be specified by a caching policy 706. The example files 1-5 shown in FIG. 7 may be used to describe a few example caching policies. In these examples, the higher power domain is asleep, thus the main store 702 is not accessible and the file sharing application stub is running in the secondary processor using the secondary storage 701 only.

In a first example, file 1 shows a file that is not duplicated in the secondary storage, perhaps for space reasons and because that file is not useful to the file sharing application at this time. If the file becomes useful to the offloaded application, it could wake the higher power domain (as in block 204) to retrieve the file into its cache, and then put the higher power domain back to sleep.

In a second example, file 2 shows a whole file being cached. This may be because the file sharing application needs to make this file available to peers. Many file sharing applications operate on a tit-for-tat basis i.e. one must make files available for upload in order to receive good download bandwidth, so this file may be cached in order to satisfy this tit-for-tat policy. In a third example, file 3 shows a partially cached file, e.g. for cases where peers do not need the whole file. In this example, the main storage 702 comprises the whole of file 3, so no further download of this file is required.

In a fourth example, file 4 shows a file which is being downloaded but is not yet complete in the main storage. While the higher power domain was asleep, the offloaded application acquired some new blocks of the file since the index listed them as not present in main storage. If the file becomes complete, this may be a cause for waking up the higher power domain, e.g. if the file was an OS patch for installation or if this was content the user had indicated an interest in viewing/hearing as soon as possible (e.g. using an application-layer wake-up filter 610, as shown in FIG. 6). In this example, in order that the application stub knows which parts of the file are still required, this information may be included within the index file 703. In another example implementation, however, the partially completed file may be synchronized between the two storage elements such that the partially completed file 4 is also stored in the secondary storage 701. In a further example implementation, a file which is representative of file 4 may be transferred to the secondary storage during synchronization, where this representation of file 4 contains, for example, zeros for portions where data is still required and ones for portions where data has already been downloaded and is stored in the main storage 702.

In a fifth example, file 5 is a new file not present in main storage yet which the offloaded file sharing application had identified as present in the peer network, not yet downloaded, and of interest for downloading (e.g. using the application state 111, 609). Thus, the download was started while the higher power domain was asleep, and the file will be copied into main storage when the higher power domain awakens.

The file sharing application and protocol which is described in the example of FIG. 7 may be one of many such applications/protocols, including BitTorrent or other peer-to-peer (P2P) file sharing systems, content or software patch distribution mechanisms, streaming protocols, etc.; the architecture and methods described herein are agnostic as to this. Furthermore, whilst the examples described herein relate to file sharing applications, the methods may also be applied to other applications, e.g. other applications where the data being distributed has no predefined destination and where the data is downloaded based on properties of the recipient device.

Although FIG. 7 and the description above refers to a synchronization mechanism 704, in some examples this mechanism may not perform a full two-way transfer of information and therefore this mechanism may alternatively be considered to be a transfer mechanism.

The transfer of the application state (e.g. cached data 112) back to the main storage (e.g. in block 206) may, in some embodiments, use a file sharing application. For example, the file sharing application stub on the lower power domain provides a first file sharing client and the main file sharing application on the higher power domain provides a second file sharing client. The file sharing client on the higher power domain may detect the presence of the other file sharing client and determine that they are in very close proximity (in terms of network connectivity) and as a result may choose to download the cached data from the file sharing client running in the lower power domain, rather than from other clients which are more distant. This allows the transfer process (e.g. in block 206 or 506 of FIGS. 2, 3 and 5) to be an automatic function of an unmodified file sharing client, and therefore makes it easier to deploy the techniques described herein using largely existing software.

Figure 8:
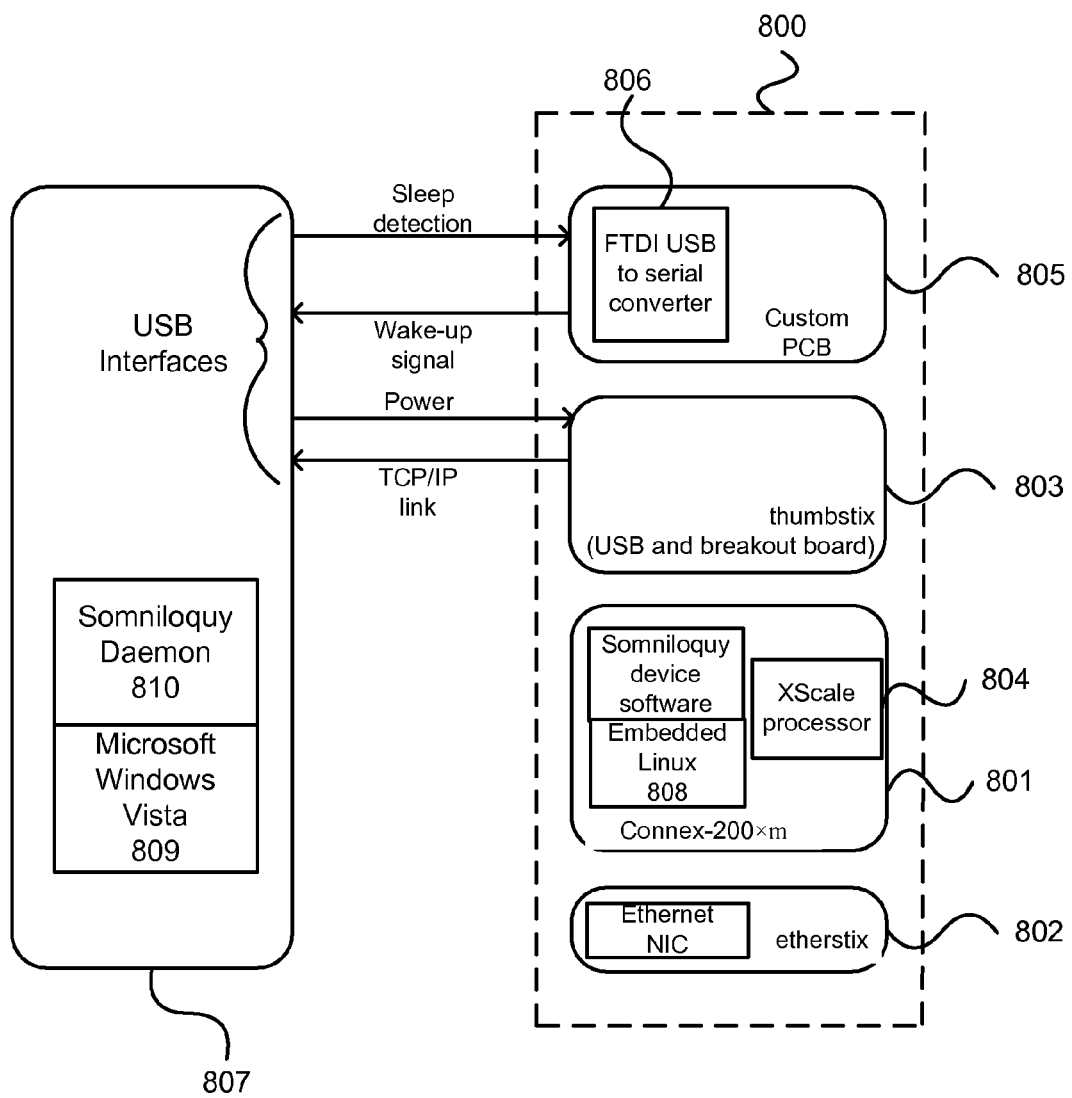
FIG. 8 shows a block diagram of an example implementation.

FIG. 8 shows a block diagram of an example implementation. The example implementation uses gumstix which is a low power modular embedded processor platform manufactured by Gumstix Inc. This provides a lower power domain in the form of a hardware dongle (or key) 800 which may be connected to existing hardware (e.g. to a desktop or laptop computer). This provides a flexible and versatile solution. This solution enables upgrading of legacy hardware. Whilst this example implementation uses gumstix, this is by way of example only and a hardware dongle may be fabricated using different technology or components.

The gumstix components used in the example implementation comprise: a a connex-200xm processor board 801, an etherstix network interface card 802 (as shown in FIG. 8) and a thumbstix combined USB interface/breakout board 803. The implementation shown in FIG. 8 is for wired Ethernet and in another example, a wifistix NIC may be used instead of the etherstix NIC 802, to provide a Wi-Fi version. The processor 804 on the connex-200xm is a low power 200 MHz PXA255 XScale processor with 16 MB of non-volatile flash and 64 MB of RAM. The etherstix 802 provides a 10/100 BaseT wired Ethernet interface plus an SD memory slot to which an SD card (e.g. a 2 GB card) may be attached. This SD card may be used as the secondary storage. The thumbstix 803 provides a USB connector, serial connections and general purpose input and output (GPIO) connections from the XScale processor 804. USB-to-serial functionality may be added to the above components using a custom designed PCB 805 that incorporates a single chip 806—the FT232RL from FTDI. This custom PCB 805 is attached to the computer 807 via a second USB port and to the thumbstix module 803 (and thence to the XScale processor 804) via a two-wire RS232 serial interface plus two GPIO lines. One GPIO line is connected to the FT232RL's ring indicator input to wake up the computer, and the second GPIO line is connected to the sleep output for detecting when the computer is in S3 state.

The computer 807 is connected to the secondary processor via two USB connections. One of these provides power and two-way communications between the two processors. In this example implementation, it is configured to appear as a point-to-point network interface ("USBNet"), over which the gumstix and the host computer communicate using TCP/IP sockets. The second USB interface provides sleep and wake-up signaling, and a serial port for debugging. Other implementations may only use one USB interface.

The hardware dongle 800 works on any desktop or laptop with USB, and supports either a wired or wireless network connection (depending on the gumstix NIC used). In this example implementation, an embedded distribution of Linux 808 is run on the gumstix that supports a full TCP/IP stack, DHCP, configurable routing tables, a configurable firewall, SSH (secured shell) and serial port communication. In other examples, different embedded operating systems may be used.

In the example implementation shown in FIG. 8, the Somniloquy host is implemented on Microsoft® Windows Vista® 809. In this example implementation, the power management APIs in Microsoft® Windows Vista® may be used to trap a suspend event, and invoke the Somniloquy daemon 810 before the host goes into the S3 state. At this point, the application state and/or cached data may be transferred. Furthermore, (e.g. if network connectivity is to be maintained transparently), the network state required (MAC (Media Access Control) address, IP address, and in the case of the wireless prototype, the SSID (Service Set Identifier) of the access point (AP)) may be transferred.

In examples where network connectivity is maintained transparently, when the host computer is awake, the hardware dongle 800 may be configured to act as a layer 2 bridge between the USBNet interface to the host PC and the Ethernet interface of the gumstix. The host's internal Ethernet interface may be disabled, thus all traffic passes through the gumstix. When the host computer goes to sleep, it transfers state to the gumstix, including its IP address. The gumstix then stops the bridging functionality, resets the MAC address of its network interface to be the same as that of the host computer's USBNet interface, and sends a DHCP renew packet with the host's IP address. It consequently appears to the rest of the network as the host processor with the same IP address, MAC address, and hostname (i.e. the hardware dongle and the host processor share a network identity). On detecting the host computer waking up (which may occur due to the gumstix waking it up, or due to the host PC being woken by a user), the gumstix immediately resets its MAC address and enables bridging.

An alternative to engineering a single NIC with a fast data path is to make use of the fact that existing PCs already have Ethernet ports. The existing port may be used for networking while the computer is awake and the gumstix's Ethernet port may be used while the computer is asleep. In another embodiment of a hardware dongle, minor changes may be made in the gumstix software. That software does not enable bridging, but copies the MAC address of the host PC when it is asleep (and uses a different one when it is awake). The MAC address copied is not that of the USBNet interface, but that of the host's own Ethernet interface. The gumstix again uses DHCP to acquire the same IP address as the sleeping host, and again wakes it up using the USB connection when suitable trigger conditions are met.

Another embodiment of a hardware dongle is a wireless version. In this example, the dongle receives a few more items of information from the host PC before going to sleep, namely the access point it is currently associated with, and other AP names and credentials which the gumstix is allowed to connect to (similar to the list kept inside the host's Wi-Fi configuration interface). This allows the hardware dongle to handle host mobility while still being asleep, since the gumstix can detect and connect to new APs that are seen.

Experimental results using a hardware dongle like that shown in FIG. 8 demonstrated 24× less power draw for desktops and 11× for laptops, comparing the system in suspend mode operation that is enabled using the methods described herein, to a state where the PC is fully on but idle (as it would be required to be without using the methods described herein).

Whilst FIG. 8 shows an example implementation where the lower power domain is implemented in hardware 800 which is separate from the host computer 807, in another embodiment, the lower power domain may be integrated within the host computer 807. As described above, the degree of integration may vary depending upon the actual implementation and in some cases hardware may be shared by the two domains.

Figure 9:
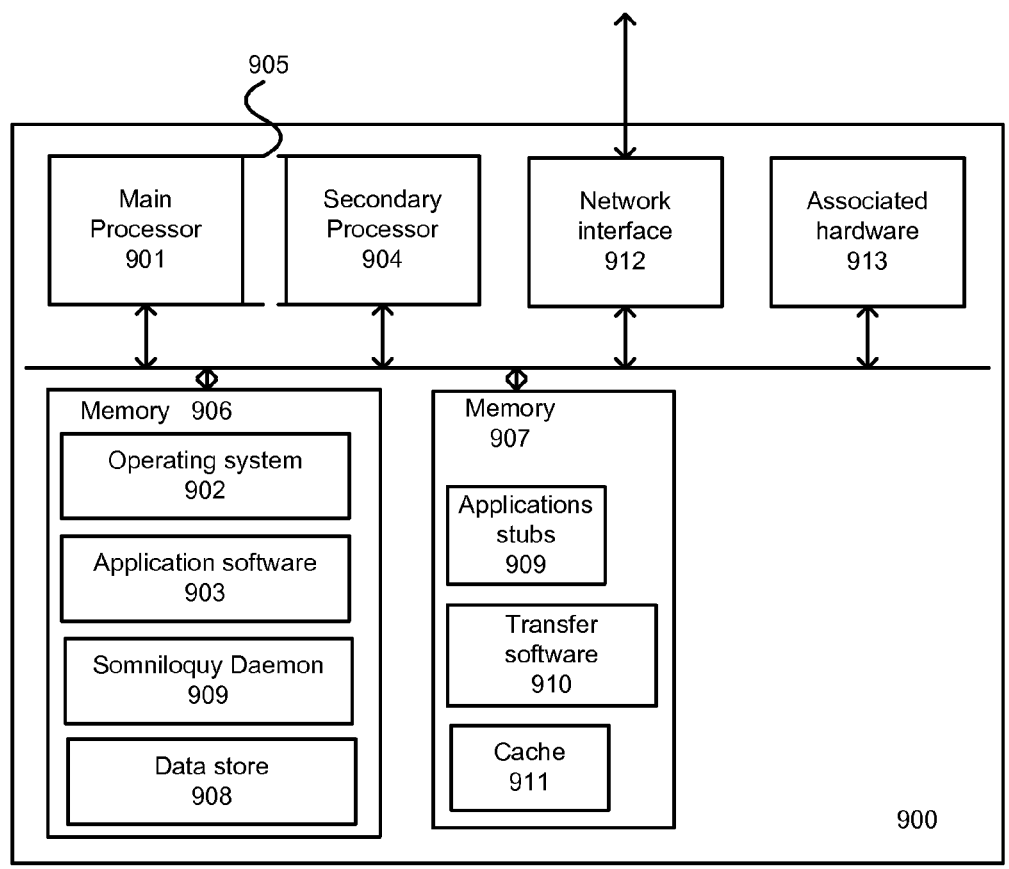
FIG. 9 illustrates an exemplary computing-based device in which embodiments of the methods described herein may be implemented.

FIG. 9 illustrates various components of an exemplary computing-based device 900 which may be implemented as any form of a computing and/or electronic device, and in which embodiments of the methods described above may be implemented.

Computing-based device 900 comprises one or more main processors 901 which may be microprocessors, controllers or any other suitable type of processors for processing computing executable instructions to control the operation of the device in order to run applications, such as file sharing applications. Platform software comprising an operating system 902 or any other suitable platform software may be provided at the computing-based device to enable application software 903 (e.g. file sharing application software) to be executed on the device.

The computing-based device 900 also comprises a secondary processor 904 which may be of a similar or different type to the main processor(s) 901. In most examples, the secondary processor 904 has a lower power consumption than the main processor 901 and may, for example, be a lower power core which is part of a multiple core main processor 901 (as indicated by the dotted lines 905).

The computer executable instructions may be provided using any computer-readable media, such as memory 906, 907. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory comprises a main (persistent) memory 906 which is associated with the main processor 901 (and forms part of a higher power subsystem or domain) and a secondary (persistent) memory 907 which is associated with the secondary processor 904 (and forms part of a lower power subsystem or domain). The memory type for the secondary memory 807 may, in some embodiments, be selected to have low power consumption.

The main memory 906 is used to store the operating system 902, application software 903 and data 908. As described above, the application software 903 may be 'sleep-aware' (or offloading aware) and comprise computer executable instructions for implementing the methods described herein. Alternatively, the main memory may be used to store separate software components which comprise the computer executable instructions which are used in performing the methods described above (e.g. the Somniloquy daemon 909).

The secondary memory 907 is used to store application stubs 909 which correspond to the applications 903 which are running on the main processor 901. The computer executable instructions which enable implementation of the methods described above (e.g. as shown in FIG. 2) are also stored in the secondary memory 907 and include transfer software 910. The secondary memory 907 also provides the cache 911 where, for example, data which is downloaded by the application stubs 909, whilst the main processor is asleep, can be stored.

The computing-based device 900 also comprises a network interface 912. This may be a wired or a wireless network interface and in some examples there may be more than one network interface (e.g. as shown in FIG. 1). In an example, the secondary processor 904, the secondary memory 907 and the network interface 912 may be integrated on a network interface card.

The computing-based device 900 also comprises additional hardware 913 which is associated with the main processor and forms part of the higher power subsystem or domain. This associated hardware 913 may comprise: a display system, user interface devices, peripheral devices (e.g. an external hard disk, webcam) etc. As this associated hardware 913 forms part of the higher power domain, when the higher power domain (which includes the main processor 901 and the main storage 906) goes to sleep, this associated hardware will be powered down (or put into a low power state).

By integrating the hardware of the higher and lower power domains (as shown in FIG. 9) the functionality may span multiple network interfaces and may be merged with other sleep-mode functionality.

Whilst the present examples are described and illustrated herein in a two tier system (i.e. a higher power domain and a lower power domain), in other examples there may be additional domains, e.g. three domains with tiered power consumption.

Although the present examples are described and illustrated herein as being implemented in a computing system for the purposes of file sharing, the system described and its use for file sharing is provided as an example and not a limitation. As those skilled in the art will appreciate, the present examples are suitable for use with variety of different types of applications which can operate in the background (i.e. without user interactivity) and where the data being distributed has no predefined destination and where the data is downloaded based on properties of the recipient device.

The methods and architecture described herein enable a class of applications to be supported whilst the main processor is asleep and power consumption is significantly reduced. The methods may be used in conjunction with techniques to maintain network connectivity and thereby enable reduced power consumption in many situations where a user is not interacting with a computing device.

The methods and architecture described herein may not require applications to be modified, although sleep-aware applications may be developed which integrate aspects of the methods described above. Dedicated software running on the higher power domain (e.g. the Somniloquy daemon) may be used to manage shut down and transfer of application state for applications which are not sleep aware (e.g. existing unmodified applications) in combination with application stubs and transfer software running on the lower power domain. No manual user activity is required, although a user may choose to configure caching and/or transfer (or synchronization) parameters or policies and/or specify events that trigger wake-up. A user may also manually initiate the process of the main processor going to sleep. The methods may operate in a manner which is transparent to the user and also transparent to the network. Where network connectivity is not maintained in a transparent manner, peers in the network may see one file sharing client disappear and another file sharing client re-appear (i.e. the file sharing client which is the application stub) but operation of the other peers is not affected.

Although many of the examples described above (e.g. FIGS. 2, 3 and 5) show application state being transferred between domains, in some examples this step may be omitted. For example, where the state is all remote and none of the state is maintained locally.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of power control comprising:
   detecting a main processor in a first power domain of a computing device entering a low power state;
   transferring application state information and network state information between the first power domain and a second power domain of the computing device; and
   executing a file sharing application stub in the second power domain based on the application state information, the second power domain having a lower average power consumption in operation than the first power domain and the application stub being arranged to autonomously perform a subset of operations of a corresponding file sharing application when the corresponding file sharing application is run in the first power domain.

2. A method according to claim 1, wherein said application state information comprises an index file, the index file comprising details of at least one portion of a file to be downloaded.

3. A method according to claim 1, wherein the corresponding file sharing application comprises one of a peer to peer file sharing application, a content distribution application and an application for downloading software patches.

4. A method according to claim 1, further comprising:
triggering the main processor to exit the low power state when trigger conditions are satisfied; and
transferring application state information between the second power domain and the first power domain.

5. A method according to claim 1, further comprising:
detecting the main processor exiting the low power state; and
transferring application state information between the second power domain and the first power domain.

6. A method according to claim 5, wherein the application state comprises data downloaded whilst the first power domain is in the low power state.

7. A computing device comprising a first power domain and a second power domain, the second power domain having a higher operational power consumption than the first power domain, the first power domain comprising:
a network interface;
an interface to the second power domain;
a secondary processor; and
memory comprising a secondary storage element and computer executable instructions, which when executed cause the secondary processor to:
detect the second power domain entering a low power state; and
autonomously perform a subset of operations of a file sharing application whilst the second power domain is in the low power state, said file sharing application comprising a file sharing application that was running in the second power domain prior to entry into the low power state; and
the second power domain comprising:
a main processor;
memory comprising a main storage element, application software and computer executable instructions, which when executed cause the main processor to:
transfer application state information between the second and first power domains, the application state information identifying a file sharing application running in the second power domain; and
enter a low power state.

8. A computing device according to claim 7, wherein said memory in the first power domain further comprises computer executable instructions which when executed cause the secondary processor to:
transfer application state information between the second and first power domains, the application state information identifying said file sharing application running in the second power domain.

9. A computing device according to claim 8, wherein said application state information comprises an index file, the index file comprising details of at least one portion of a file to be downloaded.

10. A computing device according to claim 7, wherein the computer executable instructions in the first power domain further comprise instructions, which when executed cause the secondary processor to:
transfer application state between the first and second power domains when the second power domain exits the low power state.

11. A computing device according to claim 10, wherein the application state comprises data downloaded whilst the second power domain is in the low power state.

12. A computing device according to claim 7, wherein the memory in the second power domain further comprises computer executable instructions, which when executed cause the main processor to:
transfer application state information between the first and second power domains on exit of the low power state.

13. A method of power control comprising:
detecting a main processor in a first power domain of a computing device entering a low power state;
transferring application state information between the first power domain and a second power domain of the computing device, wherein said application state information comprises an index file, the index file comprising details of at least one portion of a file to be downloaded; and
executing a file sharing application stub in the second power domain based on the application state information, the second power domain having a lower average power consumption in operation than the first power domain and the application stub being arranged to autonomously perform a subset of operations of a corresponding file sharing application when the corresponding file sharing application is run in the first power domain.

14. A method according to claim 13, wherein the corresponding file sharing application comprises one of a peer to peer file sharing application, a content distribution application and an application for downloading software patches.

15. A method according to claim 13, further comprising:
triggering the main processor to exit the low power state when trigger conditions are satisfied; and
transferring application state information between the second power domain and the first power domain.

16. A method according to claim 13, further comprising:
detecting the main processor exiting the low power state; and
transferring application state information between the second power domain and the first power domain.

17. A method of power control comprising:
detecting a main processor in a first power domain of a computing device entering a low power state;
executing a file sharing application stub in a second power domain, the second power domain having a lower average power consumption in operation than the first power domain and the application stub being arranged to autonomously perform a subset of operations of a corresponding file sharing application when the corresponding file sharing application is run in the first power domain;
detecting the main processor exiting the low power state; and
transferring application state information between the second power domain and the first power domain, wherein the application state comprises data downloaded whilst the first power domain is in the low power state.

18. A method according to claim 17, further comprising, prior to executing the file sharing application stub:

transferring initial application state information between the first power domain and the second power domain of the computing device, and wherein executing a file sharing application stub in the second power domain comprises:

executing a file sharing application stub in the second power domain based on the initial application state information.

19. A method according to claim 17, wherein the corresponding file sharing application comprises one of a peer to peer file sharing application, a content distribution application and an application for downloading software patches.

* * * * *